Dec. 10, 1957  R. P. MEYER  2,815,633
AUTOMATIC POWER LAWN MOWER
Filed June 2, 1953  5 Sheets-Sheet 1
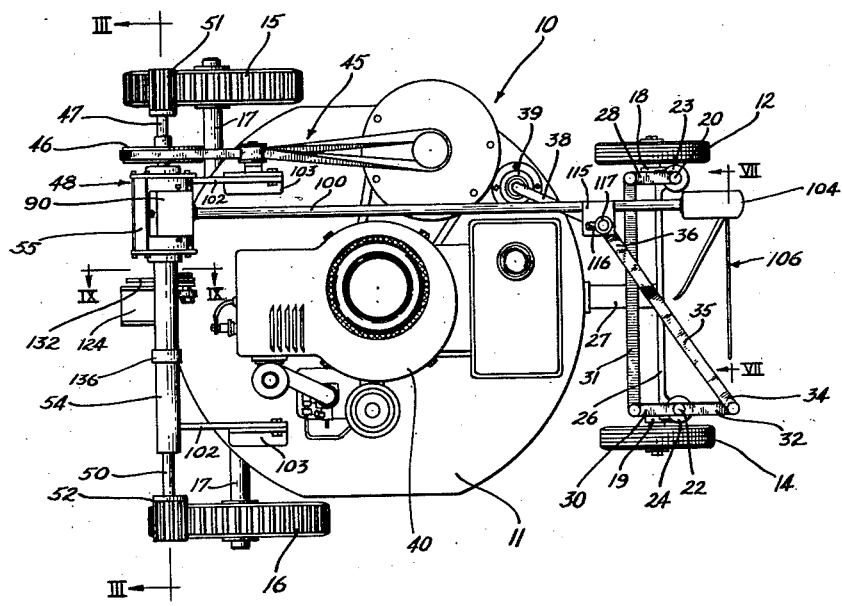
INVENTOR
RAYMOND P. MEYER
BY
Paul L. Krohn
ATTY.

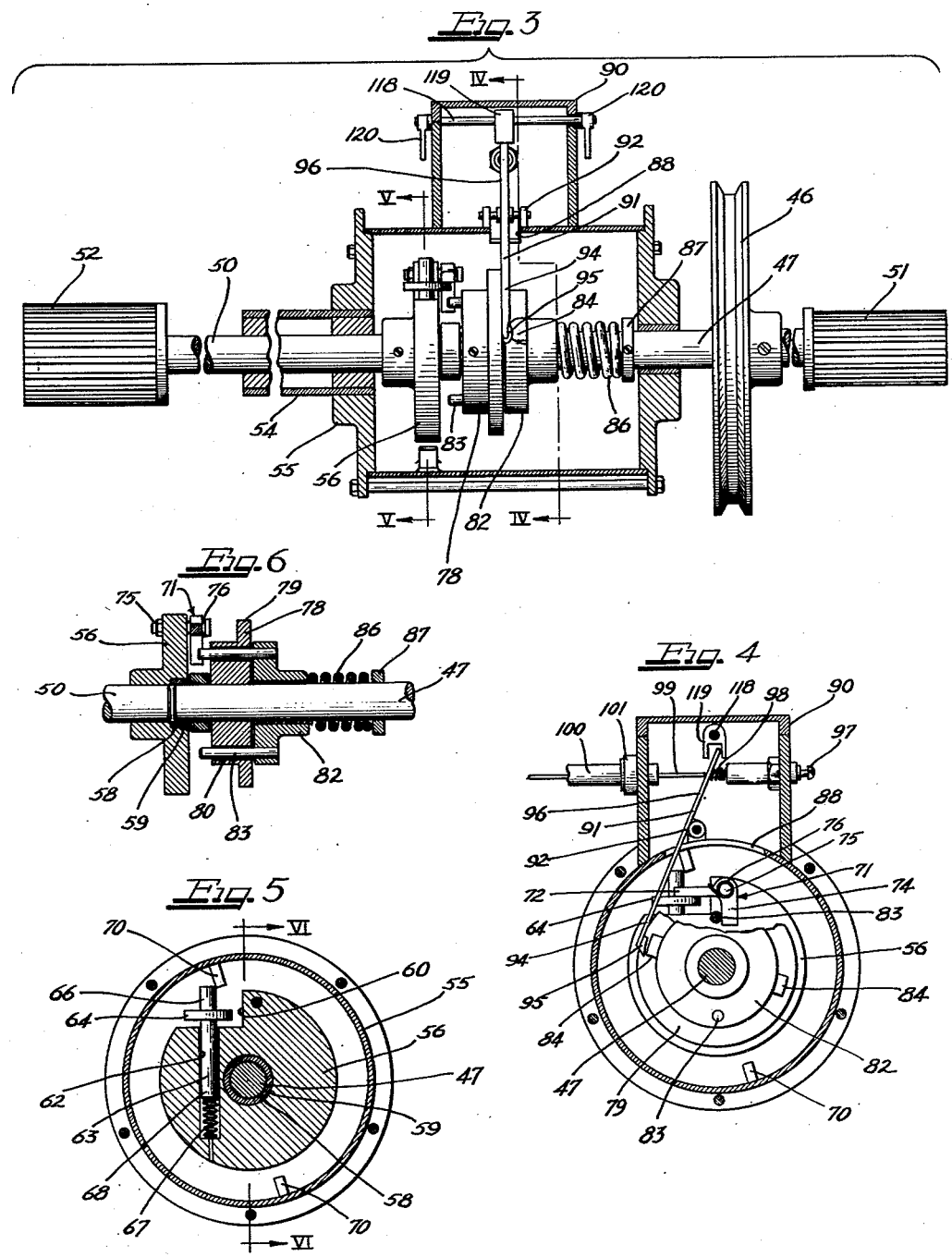

Dec. 10, 1957  R. P. MEYER  2,815,633
AUTOMATIC POWER LAWN MOWER
Filed June 2, 1953  5 Sheets-Sheet 3
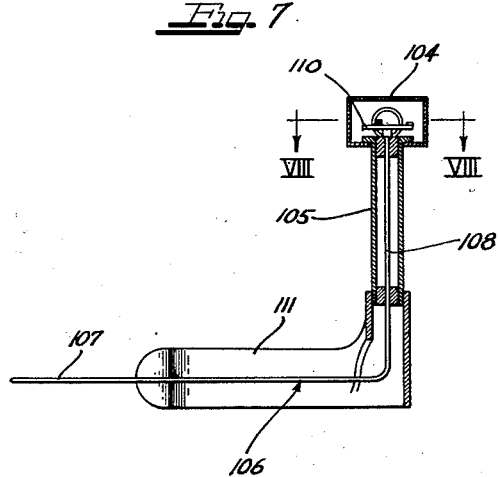
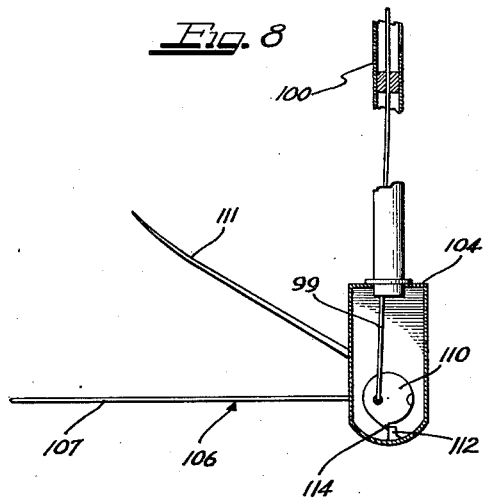
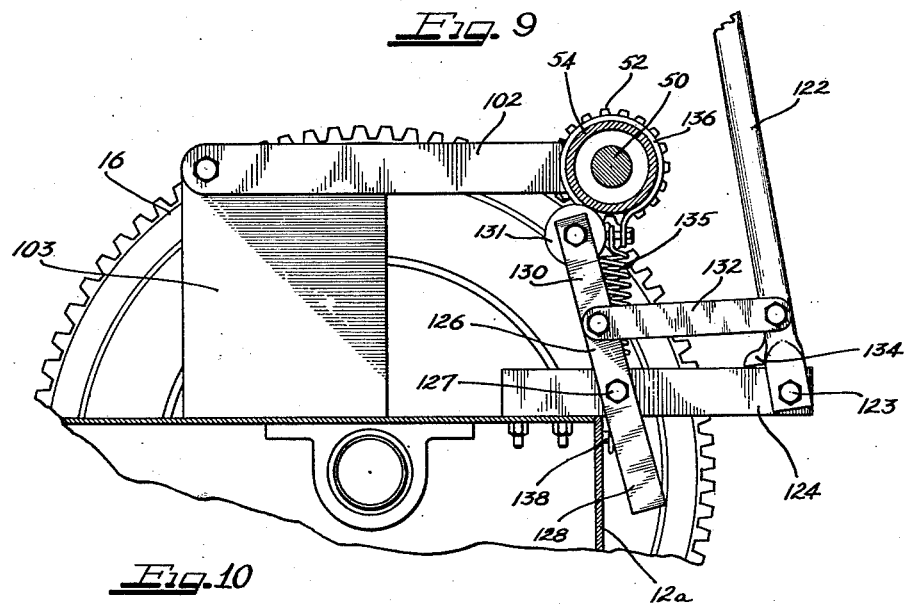
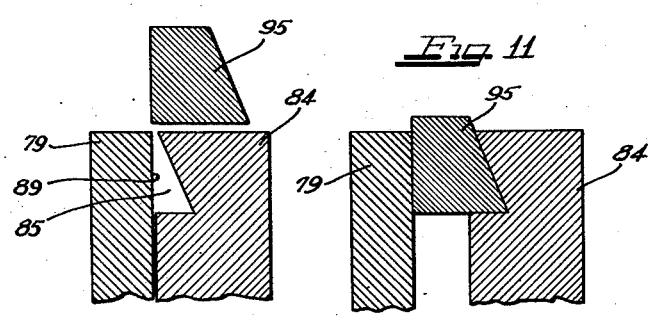
INVENTOR
RAYMOND P. MEYER
BY
ATTY.

Dec. 10, 1957  R. P. MEYER  2,815,633
AUTOMATIC POWER LAWN MOWER
Filed June 2, 1953  5 Sheets-Sheet 4
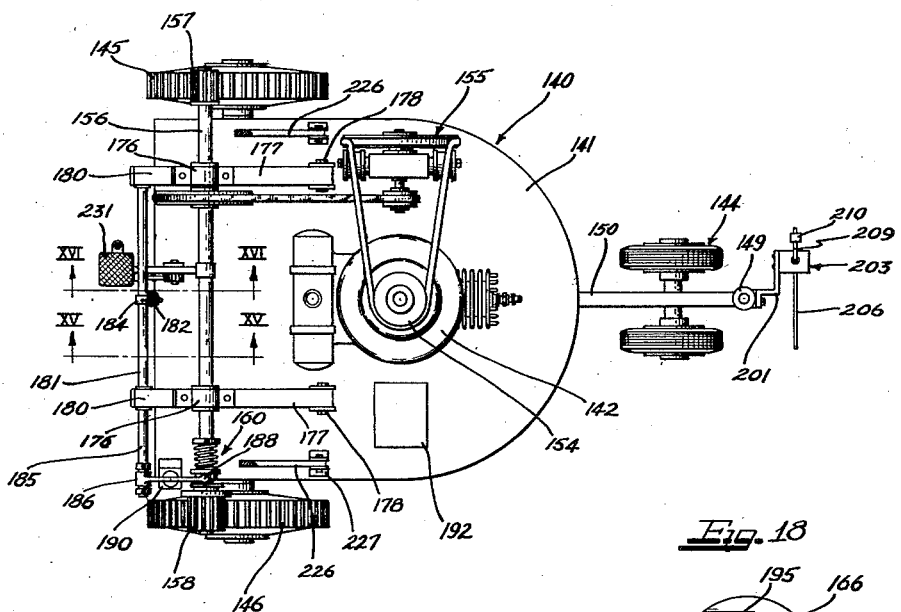
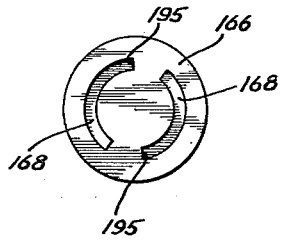
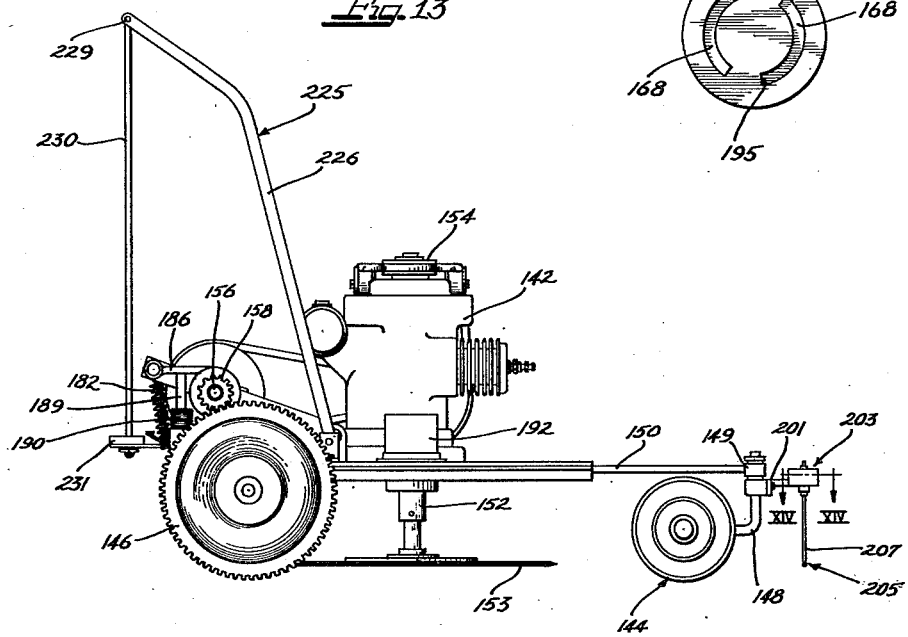
INVENTOR
RAYMOND P. MEYER
BY
ATTY.

Dec. 10, 1957     R. P. MEYER     2,815,633
AUTOMATIC POWER LAWN MOWER
Filed June 2, 1953     5 Sheets-Sheet 5
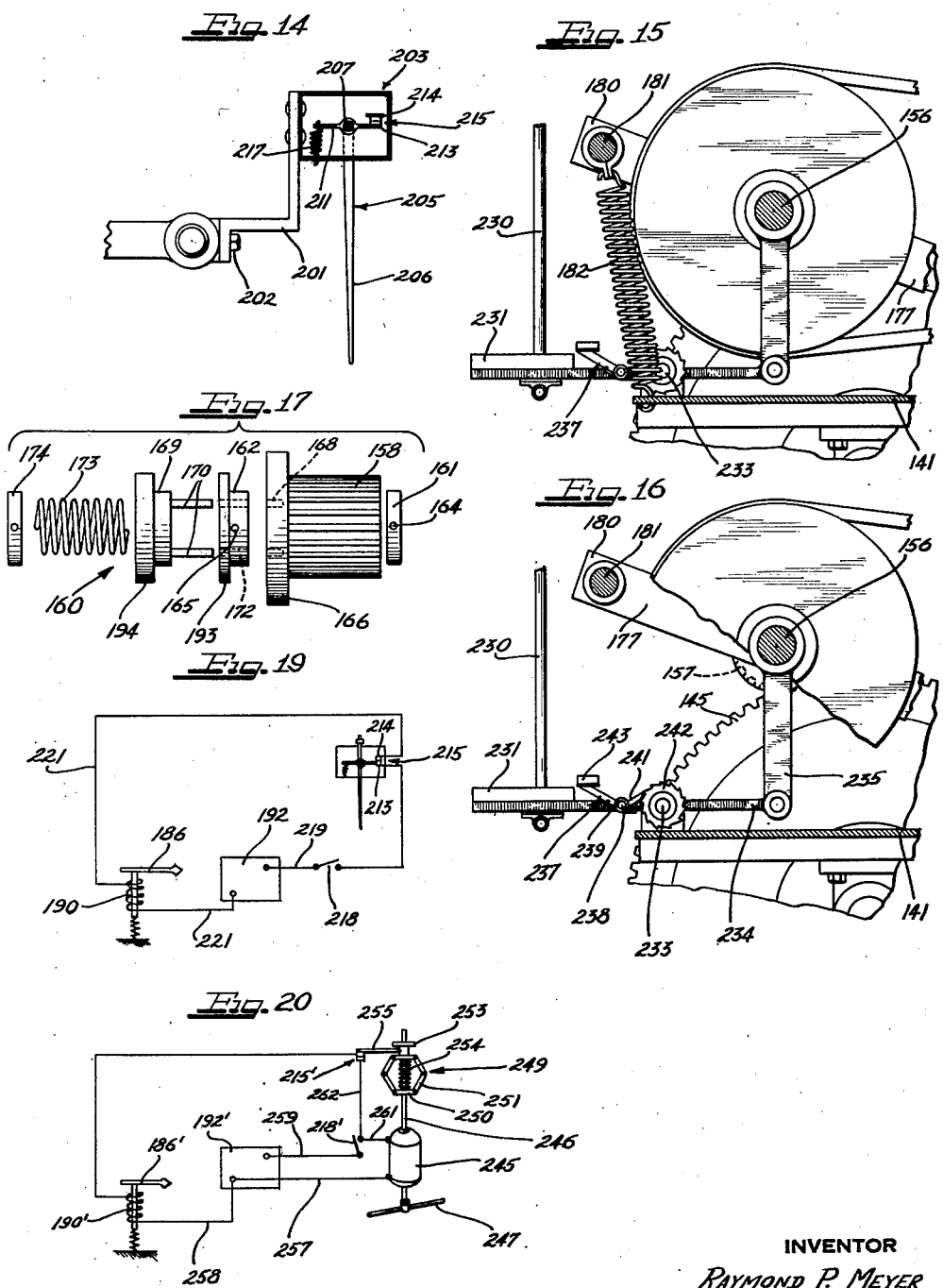
INVENTOR
RAYMOND P. MEYER
BY
ATTY.

United States Patent Office 2,815,633
Patented Dec. 10, 1957

2,815,633

AUTOMATIC POWER LAWN MOWER

Raymond P. Meyer, Omaha, Nebr., assignor to Root Manufacturing Company, Inc., Baxter Springs, Kans., a corporation of Kansas Application June 2, 1953, Serial No. 359,117

10 Claims. (Cl. 56—25.4)

The present invention relates to self-propelled power mowers, and more particularly to new and useful improvements in automatic, self-steering power mowers.

It is an object of the present invention to provide a powered, self-propelled mowing machine which in mowing operation, is self-steering and thereby does not require manual steering supervision of an operator.

Another object of the invention is to provide an improved power mower having self-contained steering control means effective to determine the mowing course of the mower in a manner to assure cutting of a given area of grass.

A further object of the invention is to provide a power mower so constructed that the mower driving mechanism is utilized in mower steering control as regulated by the self-contained steering control means, to determine the desired course of the mower.

Accordingly, the present invention features a powered mower having both the cutting means and the traction means operated from a single power source, wherein the traction means includes toothed traction wheels which are engaged by pinion gears of unequal size, with the larger pinion gear driven through a clutch member. When both traction wheels are being driven by their respective pinion gears, the mower will turn in one direction due to the difference in the size of the pinion gears, whereas when the clutch is disengaged, the larger pinion gear will not have a driving connection and the mower will swing in the opposite direction.

Thus, steering of the mower may be readily accomplished automatically by effecting alternate clutching and de-clutching of the larger pinion gear in response to the operation of suitable grass sensing means located at the forward end of the mower, for reaction to cut and uncut grass.

These and other objects and advantages of this invention will be apparent from the following description, reference being made to the accompanying drawings in which:

Fig. 1 is a top plan view of a power mower (handle not shown) illustrating a preferred embodiment of the present invention.

Fig. 2 is a side elevational view of the mower as shown in Fig. 1.

Fig. 3 is an enlarged transverse section of the drive shaft assembly in driving or clutched engagement, taken on line 3—3 of Fig. 1.

Fig. 4 is a vertical section taken on line 4—4 of Fig. 3, showing the clutch parts in initial clutching engagement.

Fig. 5 is a vertical section taken on line 5—5 of Fig. 3.

Fig. 6 is a sectional detail view of the clutch elements, as taken on line 6—6 of Fig. 5.

Fig. 7 is an enlarged sectional view of the feeler mechanism, taken on line 7—7 of Fig. 1.

Fig. 8 is a horizontal section taken on line 8—8 of Fig. 7.

Fig. 9 is an enlarged transverse section through the drive shaft and mower frame as taken substantially on line 9—9 of Fig. 1.

Fig. 10 is a fragmentary view shown in greatly enlarged section, of the clutch cam members in an inoperative position.

Fig. 11 is a view similar to that of Fig. 10, but showing the clutch cam members in camming engagement.

Fig. 12 is a top plan view of a power mower (handle not shown) illustrating a modification of the present invention.

Fig. 13 is a side elevational view of the mower as shown in Fig. 12.

Fig. 14 is a horizontal section, on an enlarged scale, taken on line 14—14 of Fig. 13.

Fig. 15 is an enlarged sectional view taken on line 15—15 of Fig. 12.

Fig. 16 is an enlarged sectional view, partly broken away, taken on line 16—16 of Fig. 12.

Fig. 17 is an enlarged exploded view, in elevation, of the clutch elements in the modification.

Fig. 18 is an enlarged elevational end view of the large pinion gear flange and the arcuate slots therein.

Fig. 19 is a diagrammatic view showing the electrical wiring for the modified form of mower.

Fig. 20 is a diagrammatic view showing the electrical wiring employed with a further modified form of feeler of a mechanical type.

For purposes of illustration, the mower shown and described herein is of a horizontal rotary blade type, it being understood that the present invention may be readily applied to mowers having any type of cutting means. Referring now to the drawing, numeral 10 designates a power mower in general, including a flat frame member or chassis 11 supported by a pair of front or lead wheels 12 and 14, and two traction wheels 15 and 16. The traction wheels 15 and 16, positioned at the rearward part of the mower, are independently journalled to the underside of the mower frame 11 in any suitable manner, as by the axles 17.

The front wheels 12 and 14 are carried by casters 18 and 19 (see Fig. 2) having their vertical stems 20 and 22 rotatably mounted in bearings 23 and 24, respectively, the bearings being integral with a cross-bar 26 supported by an extending member 27 of the chassis 11. The stems 20 and 22 extend upwardly and beyond their particular bearings sufficiently for securement to horizontal members or arms 28 and 30, respectively. Each of the arms is pivotally connected to a tie-rod 31, thereby affording means for interconnecting the wheel casters to maintain a substantial parallel relation to the lead wheels, it being noted that these wheels are free to turn in the direction of mower steering.

As can best be seen in Fig. 1, arm 30 is provided with an extending portion 32 pivotally secured to one end 34 of a diagonal bar 35, the other end 36 of said bar being pivotally carried on a pivot rod 38 journalled at 39 to the mower frame 11. Angular movement of the lead wheels 12 and 14, acting as a unit, will be translated to the diagonal bar 35 and pivot rod 38, the purpose for which will be fully described later.

As shown in Fig. 2, the single power source or motor means for the mower may be and preferably is a gasoline engine 40 mounted on the chassis 11 in any suitable manner with its drive shaft 42 vertical. A rotary type cutter blade 43 disposed under the mower frame, is adjustably keyed to one end of the drive shaft 42 by means of a set screw 44, the latter permitting elevational adjustment of the cutter to the desired cutting height.

Also secured to the drive shaft 42 is a pulley (not shown) which through a proper arrangement of belts and pulleys designated generally by reference numeral 45, Fig. 1, provides a driving connection to pulley 46 keyed to a horizontal drive shaft member 47. One end of the shaft 47 is housed in a clutch mechanism 48 for clutch connection to an aligned horizontal drive shaft member 50. Disposed at the outer ends of shafts 47 and 50 are pinion gears 51 and 52 which mesh with gear teeth provided in the peripheral or tread surfaces of the traction wheels 15 and 16, respectively. For a purpose to be described, the pinion gears are of unequal size, or diameter, the smaller gear 51 being driven directly by shaft 47 whereas the large gear 52 is driven intermittently and selectively through clutch mechanism 48.

Referring now to Figs. 3, 4, 5, and 6, these show enlarged views of the clutch mechanism in detail, indicating the relative disposition of the clutch elements therein. As shown, the horizontal drive shaft 50 having pinion gear 52 fixed thereto, is journalled in a housing sleeve 54 in a manner to extend slightly into clutch housing 55. The horizontal drive shaft 47 having pinion gear 51 and pulley 46 keyed thereto, is suitably journalled in clutch housing 55 to extend into the housing toward and aligned with the shaft 50. A clutch plate 56 suitably keyed to shaft 50, is provided with a counterbore 58 fitted with a bushing 59 which receives and journals the end of shaft 47 (Fig. 6).

As best seen in Fig. 5, the clutch plate 56 is provided with a peripheral cut-out portion 60 having a bore 62 in one face thereof for receiving a spindle 63, said spindle having a circular flange 64 formed near the outer end 66 thereof. A compression spring 67 disposed in the bore adjacent the inner end 68 of spindle 63, places a load on the spindle urging it outward and into contact with a clutch stop 70, said stop projecting inwardly from clutch housing 55. As shown, the clutch housing is provided with two such stops, spaced 180° apart, the purpose for which will be described later.

A lever or bell-crank 71 having lever arms 72 and 74, is rotatably secured on one side of clutch plate 56 by means of a bolt 75. The bell-crank is so positioned that arm 72 abuts the spindle flange 64, and arm 74 extends inward toward the clutch plate axis. A torsion spring 76 disposed between and fixed to the bell-crank 71 and the bolt 75, is utilized to bias the bell-crank and so maintain lever arm 72 in abutting contact with the spindle flange at all times. The torsion spring 76, though adequate to load the bell-crank to follow the movements of the spindle flange, is considerably weaker than the compression spring 67 and does not, therefor, impede or prevent outward movements of the spindle.

Spaced apart from the clutch plate 56 and suitably keyed to horizontal drive shaft 47 is a clutch disc 78, said disc having a circumferential flange 79 formed on one end thereof, and two diametrically opposite openings 80 bored axially therethrough. A clutch sleeve 82 slidably mounted on shaft 47, is disposed adjacent clutch disc 78 and is provided with two diametrically opposite pins 83 which are received in the openings 80 of the clutch disc. The pins are of sufficient length so that when the clutch sleeve abuts the clutch disc, the pins will extend beyond the disc and into the area intermediate the disc and the clutch plate. The clutch sleeve 82 includes two pins 84 (Figs. 3, 4, 10, and 11) formed on the outer periphery thereof and spaced 180° apart, each pin providing an under-cut, wedge-shape recess 85 opposed to the side face 89 of flange 79. For a purpose to be described, the wedge-shaped pins 84 are positioned at a certain predetermined angular distance from the pins 83.

A compression spring 86 disposed intermediate a shaft collar 87 keyed to shaft 47, and the clutch sleeve 82, urges the clutch sleeve toward abutment with the clutch disc 78. It is apparent that such action will extend the pins 83 into the area between the clutch disc and the clutch plate, thereby permitting one of the pins to contact the bell-rank arm 74 (Fig. 4). As seen in Fig. 4, one of the pins 83 in clockwise rotation of the disc 78, will actuate the bell-crank 71 such as to cause lever arm 72 to act on spindle flange 64, depressing spindle 63 out of contact with stop 70. The clutch plate, then being free to rotate, will be driven by the clutch sleeve through the positive engagement of pin 83 with bell-crank arm 74.

Referring now to Figs. 3 and 4, the clutch housing 55 is provided with an opening 88 in the outer surface thereof, and a box-like structure 90 is mounted over the opening, said opening being located substantially in alignment with the clutch sleeve 82. A rod or clutch lever 91 pivotally fixed to the outer periphery of the clutch housing, as at 92, is disposed through said opening so that one end 94 having a wedge-shape cam head 95 (Figs. 3 and 10) formed thereon, extends into the clutch housing, while the other end 96 extends into the box-like structure 90.

As seen in Fig. 4, the rod end 96 is in abutment with a small compression spring 98 on one side of the rod end, and with a wire 99 on the other side. The spring is secured in any suitable manner, preferably adjustable through set screw 97, to the back wall of the structure 90, while the wire is slidably retained and guided in a sleeve 100, said sleeve being secured to the front wall of structure 90 by means of a resilient fitting 101. In the position of the rod as shown, the cam head 95 on rod end 94 is disposed adjacent to, but clear of, the path described by the rotating wedge-shaped pins 84 carried by the clutch sleeve 82.

Having now described the details of the drive and clutch mechanisms, it should be noted (Fig. 3) that these mechanisms are provided as a unit with clutch housing 55, for support on the mower frame. As shown in Figs. 1 and 9, two support arms 102 pivotally carried by chassis blocks 103, are suitably secured as by welding, one to the housing sleeve 54 and the other to the clutch housing 55. Thus it is apparent that this support arrangement permits the full weight of the various clutch and drive members to urge the pinion gears downward and into full mesh with the traction wheels, and also, for a purpose to be described, will permit elevation of the pinion gears out of mesh with said wheels.

Referring now to Figs. 1 and 2, the sleeve 100 extends forward and downward to a position in front of the lead wheels 12 and 14, and is provided with a relatively small casing member 104 thereon. Secured to the member 104 and depending therefrom is a tube or sleeve 105 (Fig. 7) having suitable means for retaining and guiding a feeler arm 106. As seen in Fig. 7, the feeler arm is generally of L-shape providing a horizontal arm 107 and a vertical arm 108, the vertical arm having disc 110 affixed to the end thereof and to which wire 99 is eccentrically secured (see Fig. 8).

It is apparent that horizontal movement of arm 107 will rotate disc 110, thereby imparting longitudinal movement to the wire 99. This action will occur within the limits of a back stop 111 for arm 107, carried by sleeve 105, and a stop 112 formed on the inner wall of member 104 and which presents an abutting surface for a projection 114 on disc 110.

Referring to Figs. 1 and 2, the sleeve 100 is provided with a bracket 115 having a slot 116 receiving the free end portion of pivot rod 38 therethrough with assembly of these parts maintained by a suitable nut 117 threaded on the end of the pivot rod 38. As before described, the diagonal bar 35 movable by the wheels 12 and 14, is pivotally carried on the pivot rod. It is obvious that lateral turning movements of the lead wheels will produce corresponding movements of the sleeve 100 such as to shift the feeler arm assembly in the direction of mower turning. In this way the feeler element 107 is positionally adjusted to and in direct proportion with the angular degree of mower turning, whereby to maintain a desired substantially constant location thereof with respect to the longitudinal axis of the path traversed by the lead wheels. Moreover, as appears in Fig. 2 a suitable spring 113 is provided between rod 38 and the under side of bracket 115, so that by threading the nut 117 in one direction or the other, the bracket and attached sleeve 100 may be correspondingly raised or lowered to adjust the elevation of feeler 107 relative to the ground.

In operation of the mower as described, it is best to first trim around trees, shrubs, etc., which may be in the area to be mowed, and then make a first cut around the plot of grass to be mowed, thereby defining the area to be automatically traversed by the mower. It is preferable, though not necessary, to position the mower on the outer border of the area thus prepared, with the mower then working inward toward the center of the area. For purposes of description, it will be assumed that the mower is placed in operation just outside the border, i. e., over cut grass in the area of said first cut.

With the engine 40 in operation, it rotates the cutter blade 43 and effects through the belt and pulley arrangement 45, drive of shaft 47 and hence, through pinion 51 in engagement with traction wheel 15, movement of the mower. The feeler or grass interceptor 107 passing over the cut grass, remains in an initial or non-actuated position determining through eccentric 110, positionment of wire 99 such that its free end is retracted from the lever 91 (Fig. 4), thereby permitting spring 98 to pivot rod 91 such as to bring cam head 95 into the path of wedge-shaped pins 84. The cam head upon engagement by either wedge-shaped pin 84 cams the clutch sleeve 82 away from the clutch disc 78 (Fig. 11), compressing return spring 86. As previously noted, the wedge-shaped pins 84 are relatively spaced with respect to the pins 83 so that the cam head 95 engages one of the pins 84 during the interval when one of the pins 83 approaches and passes through the zone of the bell-crank arm 74. This camming action occurs twice in every rotation of shaft 47, the spring 86 acting after each camming operation to return the clutch sleeve toward abutment with the clutch disc. So long as the feeler arm 107 remains in its initial or non-actuated position (over cut grass), the spring 98 acting against pivot rod 91, maintains the cam head 95 in position for engagement by the wedge-shaped pins 84, with resultant movement of the clutch sleeve 82 sufficiently to prevent contact of pins 83 with the bell-crank arm 74. Thus under these conditions, traction wheel 15 is driven by shaft 47 through pinion gear 51, while traction wheel 16 is not so driven by its pinion gear 52, since clutching of shaft 47 to shaft 50 is prevented by the de-clutching action above described.

It is apparent from the foregoing, that in order to assure the effectiveness of the above described de-clutching action whenever the cam head 95 is disposed in position for camming engagement with the pins 84, the bell-crank arm 74 must be then in either of two positions with respect to the cam head 95. One such position is that exemplified in Fig. 4, wherein when a pin 84 approaches the camming zone of head 95, one of the drive pins 83 will be approaching the crank arm 74, so that upon camming displacement of the member 82, such drive pin will be displaced from contact with the crank arm. The other position of the crank arm in which the same action will occur, is a half-turn or 180 degrees from the crank arm position shown in Fig. 4, this being permitted because of the provision of the two diametrically opposed pins 83. This spatial relationship of the crank arm 74 and cam head 95 is here determined by locating the fixed stop projections 70 substantially as shown in Fig. 4. Thus the upper projection 70 stops the bell-crank in the first noted position through contact of the spindle end 66 with the stop, while the lower projection 70 diametrically opposite the upper one, effects the second indicated position of the bell-crank in the same manner.

When the drive to traction wheel 16 is de-clutched while drive of traction wheel 15 continues, it will be observed from the plan view of Fig. 1 that the mower will swing in the clockwise direction, about wheel 16 as a turning fulcrum. Under this condition the drive pinion 52 (on traction wheel 16) is held against turning in the drive direction, by abutment of the spindle end 66 with one of the fixed stops 70. Consequently, the pinion 52 then will brake and lock the wheel 16 against forward drive rotation, thus enhancing the action of the wheel as a turning fulcrum for the mower. Also, because of the 180 degrees spacing of the fixed stops 70, this braking action will become effective within a half-turn of the pinion 52, so that no more than a fractional turn of the wheel 16 (determined according to the gear-ratio of the wheel and its drive pinion 52) can take place from the time de-clutching is initiated to the time of engagement of the spindle end 66 with a stop 70.

Continuing with mower operation, as the mower turns clockwise under the declutched condition of traction wheel 16, and approaches uncut grass in the course of its travel, the feeler arm 107 at the forward end will come into contact with such uncut grass. The cumulative pressure of the blades of uncut grass on the horizontal arm 107 will pivot the arm rearwardly toward stop 111, and thereby actuate disc 110 to displace wire 99 in the direction of the rear end of the mower. This movement of wire 99 engages its clutch control end with lever 91 (Fig. 4), moving the latter against spring 98. The resultant pivoting of rod 91 disposes cam head 95 clear of the path of the wedge-shaped pins 84 (Figs. 4 and 10), thus allowing spring 86 to urge clutch sleeve 82 toward clutch disc 78, with pins 83 in position for contact of one thereof with arm 74. Upon engagement of a pin 83 with bell-crank arm 74, the bell-crank will be thereby actuated to move its crank arm 72 for depressing spindle 63 clear of the stops 70. The continuing contact of a pin 83 with bell-crank arm 74 provides a clutch connection between shaft 47 and shaft 50, thereby driving the pinion gear 52, which in turn transmits drive to the traction wheel 16.

It is now apparent that when the grass interceptor or feeler is in contact with uncut grass, the driving engagement between shaft 47 and 50, as above described, is maintained. Further, due to the difference in the size of the pinions 51 and 52, the traction wheels 15 and 16 are driven at different speeds. Hence, since the larger pinion gear 52 is associated with wheel 16, the latter then rotating at a speed greater than that of wheel 15, will cause mower movement in a counterclockwise direction, as away from the uncut grass.

From the foregoing description it will appear that when the mower is placed on the lawn border with its feeler over cut grass, it will move first in a clockwise direction until uncut grass is encountered by the feeler arm 107. Thereupon and in response to the action of the feeler, the shafts 47 and 50 will be clutched in driving relation, to result in mower swing in a counterclockwise direction. Now, when the feeler loses contact with uncut grass (i. e., passes over cut grass again), the spring 98 acting through wire 99, returns the feeler to normal unactuated position, and at the same time positions cam head 95 for effecting disconnection of the driven shaft 50 from the driving shaft 47, resulting once again in clockwise mower movement. As these operations continue, the mower swings toward and away from uncut grass in an alternate, zig-zag manner, thereby describing a path of mower travel which is essentially in the form of a continuous series of relatively short zig-zag lines each of an arcuate trend.

As before described, the feeler arm 107 is positioned in front of the lead wheels 12 and 14, and its position is adjusted automatically by and with lateral turning of these wheels, so that the feeler is at all times centered with respect to the longitudinal axis of mower travel. This correlated action places the feeler arm in a position leading the mower movement such as to assure cutting of the grass encountered by the feeler arm.

The mower in automatic operation, will continue to seek out and mow uncut grass until all of the grass in the defined areas has been cut, whereupon finding no grass capable of tripping the control means, the mower will turn in a circle, clockwise about wheel 16 as a fulcrum, until the operator shuts off the gasoline engine. It should be noted, that if the mower is initially placed in the center of the lawn, it is best to make one first cut to provide a working border for the feeler arm. The mower then will perform outwardly from the center, ending in the outer cut margin of the area to be mowed.

It is to be noted here that because the control force of power of the grass feeler mechanism in response to uncut grass, is very small, the arrangement is such as described, to utilize grass actuation of feeler arm 107 merely to retract wire 99 from lever 91 and thereby allow light spring 98 to pivot lever 91 such as to bring cam head 95 into the path of wedge pins 84. Thereafter, the wedge-shaped camming head 95 backed by the side face 89 of flange 79 on member 78 (Fig. 10), is received in the wedge-shape recess 85 of pins 84 as each approaches and passes through the zone of head 95, whereby to cause camming displacement of the clutch pin supporting member 82. In so doing, the camming reaction of head 95 is in a direction transversely of the lever 91 and against the face 89 of flange 79, so that this reaction is removed from the light spring 98.

Referring now to Figs. 3 and 4, the box-like structure 90 is provided with a rotatable rod 118 having a U-shaped arm 119 depending therefrom in a manner so as to span pivot rod end 96. The rod 118 is suitably journalled in the structure 90 and extends sufficiently at either end to have fingers 120 fixed thereto. This particular structure provides means for manually clutching and de-clutching, merely by swinging the fingers to rotate the rod in the appropriate direction.

The mower thus far described, is fully automatic and does not require attendance or supervision during operation. However, to enable the operator to make first cuts or to move the mower manually for any purpose, a handle or pushing lever is provided in an arrangement for effecting disengagement of pinion gears from the traction wheels when the handle is in pushing position. As indicated in Figs. 1 and 2, the handle 122 disposed centrally and to the rear of the mower, is pivotally secured in any suitable manner, as at 123, to a flanged member 124 extending from and fixed to the mower frame 11. As shown in Fig. 9, a lever arm 126 pivotally secured by pin 127 to member 124, has one end 128 disposed downward and to the rear of the mower frame, while the other end 130 having a roller 131 rotatably secured thereto, extends upward and forward of the pivot pin 127. A link 132 disposed between and secured to the handle 122 and the lever arm 126, affords a connection for causing the lever arm to follow arcuate movement of the handle. A flange or stop 134 formed on the handle, abuts member 124 to limit forward handle movement, while lever arm end 128 abuts a chassis flange guard 12a to limit the rearward movement of the handle. Pulling the handle back or to the rear, will cause link 132 to move lever arm 126 in an arcuate path about pivot pin 127. Roller 131 will then cam against housing sleeve 54, elevating said sleeve sufficiently to place the pinion gears 51 and 52 out of mesh and clear of toothed traction wheels 15 and 16. The mower now can be propelled manually regardless of whether or not the gasoline engine is running. When it is desired to return the mower to automatic operation, the handle is pushed forward, thereby moving the roller out from under the housing sleeve and permitting the pinion gears to drop into mesh with the traction wheels. To facilitate response in the meshing operation, a tension spring 135 is disposed between the housing sleeve and the mower frame, with one end of the spring fixed to a bracket 136 carried by the housing sleeve, while the other end is suitably secured, as at 138, to the mower frame. The spring 135 affords an additional advantage in that the drive mechanism is thereby placed under tension to assure positive mesh of the pinion gears with the traction wheels.

The mower, when placed in automatic operation, will cut a given area of grass normally without any need of attention by an operator. In so operating, the mower moves along the border or edge of the grass, swinging alternately towards and away from the uncut grass. In this respect, it should be noted that due to the rapid and positive response of the clutch means to the feeler control means, swinging of the mower in long or sustained movements first in one direction and than the other is thereby avoided. Consequently, the mower travels generally in a path defined by the grass border, with mower movement in that path consisting of short and rapid arcuate movements alternately to one side and the other of the longitudinal line of travel.

In respect to the present mower embodiment, it should be noted that the mower cutting operation and directionally controlled mower movement are produced from a single source of power supply, herein gasoline engine 40. This being so, the particular belt and pulley arrangement for transmitting power to the drive shafts, together with the size of the pinion gears and the traction wheels, should be predetermined and correlated in order to determine the most effective mower speed, mower clutching response, and area traversed by the mower between clutching and declutching operations.

Having now described a preferred embodiment of the present invention, reference is made to Figs. 12 to 20 wherein modifications of said invention are shown in detail. It is possible, of course, to employ or embody various other modifications of structure and assembly within the concept of this invention. Therefore, the modifications hereafter described are merely illustrative as such, and are not to be understood as comprehensive or exclusive.

Referring now to the drawings, numeral 140 designates in general a power mower including a flat frame member or chassis 141 having gasoline engine 142 mounted thereon and supported by a pair of lead wheels 144 and two toothed traction wheels 145 and 146.

The wheels 144, disposed forward or to the front of the mower, are carried by a caster bracket 148 which is rotatably mounted in bearing 149, said bearing being supported by an extending member 150 of chassis 141. The traction wheels 145 and 146 are positioned to the rearward part of the mower, and are independently journalled in any suitable manner, to the underside of the mower frame.

As shown in Fig. 12, the gasoline engine 142 is mounted on chassis 141 in any suitable manner such that its drive shaft 152 is vertical. A disc type cutter 153 disposed under the mower frame, is adjustably keyed to one end of drive shaft 152, while the other end of said shaft has secured thereto a pulley 154 which through a proper arrangement of belt and pulleys 155, Fig. 12, provides a driving connection to a horizontal drive shaft 156.

Disposed at the ends of horizontal drive shaft 156 are pinion gears 157 and 158 which mesh with toothed traction wheels 145 and 146, respectively. As seen in Fig. 12, the pinion gears are of unequal size, the smaller gear 157 being keyed directly to shaft 156, whereas the larger gear 158 is driven by said shaft through a clutch mechanism 160.

Referring now to Fig. 17, there is shown in exploded view, the clutch mechanism 160 and the pinion gear 158 which is driven thereby. Said pinion gear, carried by horizontal drive shaft 156 but not keyed thereto, is disposed between shaft collar 161 and clutch collar 162, both collars being positively secured to said shaft as by means of set screws 164 and 165, respectively. A flange 166 formed on that portion of the pinion gear adjacent clutch collar 162, is provided with two arcuate slots or recesses 168 on the outer surface thereof, said slots being diametrically opposed, Fig. 18. A plug-like member or clutch sleeve 169, freely mounted on shaft 156, is provided with two pronged portions or drive pins 170, spaced 180 degrees apart and which are slidably contained in passages 172 of clutch collar 162. The drive pins are of such length that when the clutch sleeve and clutch collar are in abutting contact, the pins extend beyond their respective passages into the slots of pinion gear 158. A compression spring 173 disposed between a fixed shaft collar 174 and clutch sleeve 169, normally maintains drive pins 170 in slots 168. It is apparent that since clutch collar 162 is keyed to horizontal drive shaft 156, when the drive pins are properly seated in the pinion gear slots, a driving connection is effected between shaft 156 and pinion gear 158. This clutched condition is maintained by spring 173, and is broken in a manner to be described, when the drive pins are withdrawn from the slots.

The horizontal drive shaft 156 is journalled in bearing blocks 176 carried by arm members 177, said arm members being pivotally mounted on chassis 141 by bolts 178. The free ends 180 of the arm members 177 are connected by a rod 181, while the rod has one end of a coiled tension spring 182 secured thereto, as by bracket 184, the other end of the spring being fixed to the mower frame. The disposition of said spring places the horizontal drive shaft under tension in the direction to assure positive engagement of the pinion gears with the traction wheels.

Rod 181 having an end portion 185 extending beyond one arm member 177, as shown in Fig. 12, has a lever 186 rotatably secured thereto, said lever having a wedge-shaped end portion or cam head 188 disposed adjacent clutch mechanism 160. Intermediate the ends of lever 186, and formed as part of said lever, is a depending member or arm 189 (Fig. 13). The arm 189 is so located as to be disposed within the magnetic field of a low current consuming solenoid 190 carried on mower frame 141, said solenoid having storage battery 192 as a source of power supply. In a manner to be described, energization of solenoid 190 will displace arm 189 downwardly from its inactive position determined by any suitable means, thereby pulling lever 186 downwardly.

As can be seen in Figs. 12 and 17, clutch collar 162 is provided with a flange 193 and clutch sleeve 169 is provided with a similar annular flange 194. Whenever solenoid 190 is energized, arm 189 is moved downwardly disposing lever 186 in a position such that wedge-shaped cam head 188 engages and enters between the flanges 193 and 194, thereby abuts flange 193 camming clutch sleeve 169 away from clutch collar 162, thus withdrawing drive pins 170 from slots 168. It is obvious that withdrawal of the drive pins from the pinion gear slots, breaks the driving connection between horizontal drive shaft 156 and pinion gear 158. Upon retraction of the cam head 188, the compression spring 173 will urge clutch sleeve 169 back into contact with clutch collar 162, thereby inserting drive pins 170 into slots 168 to re-establish the drive connection upon contact of the pins with the slot shoulders 195.

Referring now to Figs. 12, 13, and 14, there is shown an angle bar 201 suitably secured, as by bolt 202, to the lead wheel bracket 148, said bar having a box-like member 203 mounted on the outer end thereof. A light weight rod 205 is offset in a manner so as to provide a horizontal portion or feeler arm 206, a vertical portion 207 journalled in box-like member 203, and a horizontal end portion 209 (Fig. 12) provided with a counterbalancing weight 210.

Disposed within box-like member 203 and fixed to the vertical rod portion 207 is a lever or contact arm 211. One end of the lever arm is provided with a contact point 213 which cooperates with a contact point 214 fixed to member 203 to comprise a breakable contact device 215. The other end of the lever arm is fastened to a tension spring 217 carried by member 203, said spring biasing the contact arm so as to close the contact device 215. Since contact arm 211 is fixed to rod 205, it is apparent that clockwise movement of the feeler arm 206 (as viewed in Fig. 14) will open the contact device 215.

As above described, the mower cutting means and traction means are motor driven, thereby affording mower travel and operation without manual assistance of an operator. The interruption of the driving mechanism, which affords self-steering, is accomplished by control means which clutches and declutches the large pinion gear relative to the horizontal drive shaft. The control means is designed to energize and de-energize a solenoid, and to this end is dependent on a source of electrical power supply, herein storage battery 192.

Refering to Fig. 19, there is shown an electrical circuit suitable for the modified mower. The source of electric current, battery 192, can be mounted on the mower frame 141 in any convenient position and in any suitable manner. It is desirable to provide the circuit with an on-off hand switch 218, at some point within easy access of the operator, thereby giving the operator a somewhat limited manual control of mower travel while the mower is in operation. As shown, the on-off switch 218 is in battery lead 219 running to contact 213 of contact device 215, whereas battery lead 221 having solenoid 190 therein, runs to contact 214. It can be seen that solenoid 190 cannot be energized unless switch 218 is closed, and thereafter only when contacts 213—214 are closed.

In operation and as previously described, it is best to first trim around the plot of grass so as to define the area to be traversed by the mower. As before and for purposes of description, it will be assumed that the mower is placed in operation just outside the edge of the given area, i. e., over cut grass.

Hand switch 218 is turned to the "on" position, or closed, thereby making energization of solenoid 190 dependent on closing of contacts 213—214. The engine 142 is then started, providing a direct drive to cutter 153 and, through the belt and pulley arrangement, to horizontal drive shaft 156. Grass interceptor or feeler 206, being over cut grass, remains in a normal unactuated position, Fig. 14, and thereby keeps contact device 215 closed. Under this condition, it is apparent that when the mower is operating over cut grass, the electrical circuit, Fig. 19, is closed. Therefore, when the mower is placed in operation over cut grass, solenoid 190 will be energized, whereby lever 186 is pivoted downwardly to place cam head 188 between flanges 193 and 194 to cam clutch sleeve 169 away from clutch collar flange 193. This camming action withdraws drive pins 170 from the arcuate slots 168, thereby breaking the driving connection between shaft 156 and pinion gear 158.

So long as feeler arm 206 remains in a normal position (over cut grass), the resultant energization of solenoid 190 will retain cam head 188 in the position for camming engagement with clutch sleeve 169 to remove drive pins 170 carried thereon, from the slots 168. Thus, whereas traction wheel 145 is driven by shaft 156 through pinion gear 157, traction wheel 146 is not so driven by its pinion gear 158, since driving engagement then is broken between shaft 156 and pinion gear 158. It is then apparent that when the grass sensing element or feeler is disposed over cut grass, the operation as above described, will cause the mower to move clockwise, or about the traction wheel 146 as a fulcrum.

When the mower, moving clockwise, approaches uncut grass, the feeler arm 206 positioned forwardly of the mower, will react to the cumulative pressure of the blades of uncut grass abutting the arm, moving the arm clockwise and thereby pivoting lever arm 211 and opening contact device 215. Thus, solenoid 190 will not be energized so long as feeler arm 206 contacts uncut grass.

The de-energization of solenoid 190 de-activates the camming action between cam head 188 and flanges 193 and 194. Thereafter, compression spring 173 causes clutch sleeve 169 to abut clutch collar 162, thereby entering drive pins 170 in the slots 168 to engage end walls 195 of the slots. The continuing contact of the pins with the shoulders of the slots provides a clutch connection between horizontal drive shaft 156 and pinion gear 158, thereby transmitting drive to traction wheel 146.

It is now apparent that when feeler arm 206 is disposed over uncut grass, the driving engagement between shaft 156 and pinion gear 158, as above described, is maintained. With this arrangement, both traction wheels are driven by shaft 156, and since pinion gear 158 is larger than pinion gear 157, the respective traction wheels are driven at different speeds. Thus, when the feeler arm contacts uncut grass, pinion gear 158 will be clutched to shaft 156 and the mower will move in a counterclockwise direction.

From the foregoing description, the mower when placed on the lawn border and over cut grass, will move first in a clockwise direction. When the feeler arm 206 contacts uncut grass, the cumulative pressure thereof overcomes biasing spring 217, pivoting lever arm 211 and thereby opening contact device 215. Pinion gear 158 is then clutched to shaft 156 and the mower swings in a counterclockwise direction. As these operations continue, the mower swings toward and away from uncut grass alternately, describing a path of travel comprised of short arcuate movements of the nature hereinbefore described.

It can be seen that the mower, so constructed, is fully automatic and dependent only on the external conditions encountered, i. e., cut and uncut grass. The mower will continue to seek out and mow uncut grass within the given area, whereupon finding no grass capable of tripping the control means, the mower will turn in a clockwise direction until the engine is shut off by the operator.

To enable the operator to move or steer the mower manually, handle means are provided to disengage the pinion gears from the traction wheels and simultaneously present an adequate pushing bar. This is best seen by referring to Figs. 12, 13, and 16. As shown, the handle 225 consists of two upright angular members 226 pivotally secured, as at 227, to the mower frame 141. The members 226 are formed so as to extend upward and to the rear of the mower, and are connected at their ends by a pushing bar 229. A vertical rod 230, carried by the pushing bar, extends downwardly, terminating adjacent the chassis and is there suitably secured to a foot pedal or lever 231 pivotally mounted, as by pin 233, to a portion of the mower frame. Said lever extends beyond the pivot point 233, having an end portion 234 pivotally connected as by link 235, to the drive shaft 156. Thus, a downward force exerted on either the foot pedal or the push bar, will pivot the foot lever 231 about the fulcrum 233, elevating the end portion 234. This action will be transmitted by means of a link 235, to the horizontal drive shaft 156, thereby raising the pinion gears 157 and 158 out of mesh with their respective traction wheels.

To maintain the mower in this manual operating condition, there is provided a pawl or offset lever 237 pivotally secured, as by pin 238, to the foot lever 231, Fig. 16. A biasing spring 239 urges one end 241 of the pawl into engagement with a ratchet wheel 242, said ratchet wheel being fixed to pivot pin 233. Therefore, whenever foot lever 231 is pivoted downwardly, pawl end 241 engages the teeth of the ratchet wheel 242, thereby locking the handle in that position. To release the handle, pawl end 243 is moved downwardly, pivoting pawl end 241 out of engagement with the ratchet wheel. Thereafter, unless the handle is manually held, the weight of the drive mechanism and the force of tension spring 182 will move the pinion gears back into mesh with the traction wheels.

As described, the modified mower is fully automatic and will cut the grass of a given area without need of an operator's attention. Further, and when desired, the driving mechanism can be disengaged and the machine propelled and steered manually.

It is obvious from the preceding description, that many different types of control means can be designed for use with the mower without departing from the basic concept of this invention. In particular, reference is made to Fig. 20 wherein there is shown a modification of the grass feeler arrangement including suitable electrical circuits for utilizing the feeler for controlling the drive mechanism.

Referring to Fig. 20, there is shown an electric motor 245 having a rotor shaft 246 which extends beyond the motor at both ends, said motor to be suitably secured to the front of the mower in a vertical position. Fixed to the lower end of shaft 246 is a feeler blade or rod 247 which describes a rotary path parallel to the ground, while carried by the upper end of said shaft is a centrifugal type governor unit 249. A collar 250 keyed to shaft 246, has the usual pivotable governor arms 251 attached thereto, said arms being fixed at their other ends to a slidable sleeve 253. A compression spring 254 disposed between collar 250 and sleeve 253, normally urges governor arms 251 to a collapsed position. When shaft rotation is sufficient to overcome the force of spring 254, arms 251 pivot outward, moving sleeve 253 downward. This movement of the sleeve is transmitted to a contact arm 255 which opens normally closed electrical contacts 215'.

As shown, a storage battery 192' has one lead 257 running to electric motor 245, and from the same battery terminal a lead 258 having solenoid 190' disposed therein, runs to one contact of device 215'. The other battery terminal has a lead 259 to on-off switch 218', and from the latter a lead 261 to the motor and a lead 262 to the other contact of contact device 215'.

In the manner previously described, upon closure of on-off switch 218', whenever contact device 215' is closed, the circuit is closed to energize solenoid 190'. However, when switch 218' is closed and contact device 215' is open, the circuit is open, so solenoid 190' is not then energized.

As before described, energization of the solenoid actuates de-clutching means which interrupts the mower drive. Thus, clutching and de-clutching of the drive mechanism is effectively controlled by the closing and opening of contact device 215', which in turn is responsive to the governor unit 249.

It can be seen that when blade 247 is disposed over uncut grass, the rotary movement of the blade is impeded and spring 254 urges sleeve 253 outward, opening contact device 215'. When the blade is not so obstructed, as when disposed over cut grass, the rotary movement thereof is sufficient to overcome the spring force and the arms 251 will pivot outward, pulling the sleeve downwardly and so closing contact device 215' (Fig. 20). In this manner the mower drive mechanism is clutched and de-clutched, dependently on the external conditions encountered by the feeler blade 247.

It is apparent from the foregoing descriptions, and with reference to the accompanying drawings, that a mower so constructed is fully automatic. When placed in operation, the drive mechanism responds to the control means which in turn, is actuated by the external conditions encountered, namely cut and uncut grass. The mower is not only self-propelled but self-steering, and will seek out and mow all of the grass within a given area. Whereupon finding no more grass to cut, it will turn in a circle until stopped by an operator.

While the foregoing specification sets forth the invention in specific terms, it is to be understood that many variations and modifications may be resorted to without departing from the broad aspects of the invention as defined by the following claims.

Having now described the invention, what is claimed is:

1. In a powered grass mower, a frame, wheel means including a pair of traction wheels in support of the frame, power means carried by said frame, drive means connecting the power means to one traction wheel for continuous drive of the wheel with the rotational speed thereof determined by the operating speed of the power means, a releasable drive connection from said drive means to the other traction wheel for drive of the latter at a rotational speed differing from said rotational speed of said one traction wheel, control means in operative connection to said releasable drive connection, said control means including a grass sensing device carried forwardly on the frame and operated by contact with grass, and means for translating operation of the grass sensing device to the releasable drive connection for actuation of the latter.

2. In a powered grass mower, a frame, wheel means including a pair of traction wheels in support of the frame, power means carried by the frame, drive means connecting said power means to one traction wheel for continuous drive of said wheel with the rotational speed thereof determined by the operating speed of the power means, tending to effect mower displacement in an angular direction about the other traction wheel as a turning center, a releasable drive connection from said drive means to said other traction wheel adapted for drive thereof at a rotational speed greater than that of said one wheel, to effect in cooperation with continuous drive of said one wheel, mower displacement in an angular direction generally opposite the first said angular direction, control means in operative connection to the releasable drive connection, said control means including a grass sensing device carried forwardly on the frame and operated by contact with grass, and means for translating operation of the grass sensing device to the releasable drive connection for actuation of the latter.

3. In a powered grass mower, a frame, lead wheels in support of the forward end of the frame, a traction wheel journalled at each side of the frame, power means carried by the frame, a grass cutter blade driven by the power means, drive means connecting the power means to one of said traction wheels for drive of said wheel continuously throughout operation of said power means, thereby tending to effect mower displacement in an angular direction about the other traction wheel as a turning center, a drive connection from said drive means to said other traction wheel including a clutch device, operable upon clutch engagement for effecting drive of said other traction wheel to cause in cooperation with said continuous drive of said one traction wheel, mower displacement in an angular direction generally opposite to the first said angular direction, control means in operative connection to said clutch device, said control means including a grass sensing element supported from said frame in advance of said lead wheels, and operated by contact with grass, and means for translating operation of the grass sensing element to the clutch device for actuation of the latter.

4. In a powered grass mower, a frame, wheel means including a pair of traction wheels in support of the frame, power means mounted on the frame, drive means connecting the power means to the traction wheels, including a drive shaft carried by the frame and having pinions mounted on the ends thereof, said pinions being of unequal size and each in mesh with a traction wheel, clutch means connecting the larger pinion to the drive shaft thereby providing a releasable drive connection to the larger pinion, control means in operative connection to said clutch means, said control means including grass sensing means disposed forwardly on the mower and operated by cut and uncut grass in the zone of the grass sensing means, and means for translating operation of the grass sensing means to the releasable drive connection for action of the latter.

5. In a self-propelled grass mower, a frame, wheel means in support of the frame and including a pair of traction wheels, motor means on the frame, drive means connecting the motor means and one traction wheel for continuous drive of the latter at a rotational speed proportional to the operating speed of the motor means, a drive connection between said drive means and the other traction wheel for effecting drive of the latter wheel at a rotational speed greater than that of said one traction wheel, said drive connection including a clutch operable to render the drive connection effective and ineffective to drive said other traction wheel, and clutch operating means, including a grass sensing element supported from the frame for operation in response to cut and uncut grass, and means for translating operation of the grass sensing means to the clutch for actuation of the latter.

6. In a powered grass mower, a frame, wheel means including a pair of traction wheels in support of the frame, power means mounted on the frame, drive means connecting the power means to one traction wheel for continuous drive of said wheel with the rotational speed thereof determined by the operating speed of the power means, tending to effect mower displacement in an angular direction about the other traction wheel as a turning center, a releasable drive connection from said drive means to said other traction wheel for drive of the latter at a rotational speed greater than that of said one wheel, to effect in cooperation with continuous drive of said one wheel, mower displacement in an angular direction generally opposite the first said angular direction, control means operatively connected to the releasable drive connection to effect engagement and disengagement of said other traction wheel relative to the drive means, said control means including a grass feeler disposed in a position forwardly on the mower for contact with uncut grass in the path of mower travel, means normally urging the feeler into an initial position and permitting the feeler to move from said position upon contact of the feeler with uncut grass, and means for translating movement of the feeler from said position, to the releasable drive connection for operating the latter to connect said other traction wheel to the drive means.

7. In a powered grass mower, a frame, lead wheels in support of the forward end of the frame, a pair of traction wheels independently journalled to the rearward part of the frame, power means mounted on the frame, a shaft element journalled on the frame, drive means connecting the power means to said shaft element for effecting continuous drive of the latter, means connecting the shaft element to one of the traction wheels and operable solely for effecting drive of said one of the traction wheels continuously throughout operation of the power means, a drive element operatively associated with the other traction wheel, a clutch device connecting said drive element to said shaft element thereby providing a releasable drive connection to said other traction wheel, a clutch lever normally in a position to effect clutch disengagement and effective upon actuation of the lever from said normal position, to cause clutch engagement, control means operatively connected to said clutch lever for controlling actuation of the latter, said control means including a grass sensing device supported from the frame in advance of said lead wheels, said device including a feeler element normally occupying an initial position and movable from said position upon contact with uncut grass, and means for translating movement of the feeler element to the clutch lever for actuation thereof.

8. In a powered grass mower, a frame, lead wheels in support of the forward end of the frame, a pair of traction wheels independently journalled to the rearward part of the frame, power means mounted on the frame, a shaft element journalled on the frame, drive means connecting the power means to said shaft element for effecting continuous drive of the latter, pinions mounted on the ends of the shaft element, said pinions being of unequal size and each in mesh with a traction wheel, a clutch device for connecting the larger pinion to the shaft element thereby providing a releasable drive connection to the larger pinion, a clutch lever normally in a position to effect clutch disengagement and effective upon actuation of the lever from said normal position to cause clutch engagement, control means operatively connected to said clutch lever for controlling actuation of the latter, said control means including a grass sensing device supported from the frame in advance of the lead wheels, said device including a movable feeler arm, means normally urging the feeler arm into an initial position and permitting the feeler arm to move from said position upon contact of the arm with uncut grass, and means for translating movement of the feeler arm from said position, to the clutch lever for actuation of said lever.

9. In a powered grass mower, a frame, lead wheels in support of the forward end of the frame, a pair of traction wheels in support of the rearward end of the frame and independently journalled thereto, power means mounted on the frame, cutter blade means operated by said power means, a shaft element journalled on the frame, drive means connecting the power means to the shaft element for effecting continuous drive thereof, a first pinion fixed on said shaft element and in mesh with one traction wheel, thereby providing a continuous drive to said one traction wheel with the rotational speed thereof determined by the operating speed of the power means, a drive element operatively associated with the other traction wheel, a clutch device connecting said shaft element to the drive element, a second pinion fixed on said drive element and in mesh with the other traction wheel, thereby providing a releasable drive to said other traction wheel, said second pinion being of greater diameter than the said first pinion such as to effect rotation of said other traction wheel at a rotational speed greater than the rotational speed of said one traction wheel, a clutch lever included in said clutch device and normally in a position to effect disengagement of the clutch, thereby causing mower travel in an angular direction about the other traction wheel as a turning center, control means operatively connected to said clutch lever for controlling actuation of the latter, said control means including a grass sensing member supported by the frame in advance of said lead wheels, said member comprising a horizontal movable feeler arm, means normally urging the feeler arm into an initial position and permitting the feeler arm to move from said position upon contact of the arm with uncut grass, and means for translating movement of the feeler arm from said initial position, to the clutch lever for actuation of said lever from said normal clutch disengaging position, thereby effecting a drive connection to said other traction wheel, and causing in cooperation with the continuous drive of said one wheel, mower travel in an angular direction generally opposite the first said angular direction.

10. In a power grass mower, a frame, wheel means including a pair of traction wheels in support of the frame, power means on the frame, drive means connected to the power means and to one traction wheel for effecting drive of the traction wheel continuously throughout operation of the power means, a drive connection including a clutch device, between said drive means and the other traction wheel for driving the latter upon clutch engagement, a clutch operating lever normally in a position effecting clutch disengagement, a movable grass sensing element carried forwardly on the frame, and a link element connecting said sensing element to said clutch lever and effective in the position of said clutch lever effecting clutch disengagement, to dispose said movable sensing element in an initial position, said sensing element responding to contact thereof with uncut grass, by movement from said initial position and effecting by such movement, operation of said link element to actuate said clutch lever to a position effecting clutch engagement, thereby rendering said drive connection operable to drive said other traction wheel.

References Cited in the file of this patent

UNITED STATES PATENTS

| | | |
|---|---|---|
| 1,627,252 | Peters | May 3, 1927 |
| 1,734,718 | Donald | Nov. 5, 1929 |
| 2,331,144 | Sitter | Oct. 5, 1943 |
| 2,451,589 | Thomas | Oct. 19, 1948 |
| 2,509,914 | Goodwine | May 30, 1950 |
| 2,513,868 | Hill | July 4, 1950 |
| 2,521,262 | Smith | Sept. 5, 1950 |
| 2,610,562 | Ward | Sept. 16, 1952 |
| 2,626,671 | Hardy et al. | Jan. 27, 1953 |
| 2,698,507 | Siebring | Jan. 4, 1955 |
| 2,708,977 | Scheppe | May 24, 1955 |